(12) United States Patent
Fromerth et al.

(10) Patent No.: US 10,913,122 B2
(45) Date of Patent: Feb. 9, 2021

(54) FORMING TOOL FOR LEADING EDGE OF TURBINE BLADES

(71) Applicant: UNITED TECHNOLOGIES CORPORATION, Farmington, CT (US)

(72) Inventors: Eric Fromerth, Manchester, CT (US); Daniel J Wright, Glastonbury, CT (US); Chung Y. Wu, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 178 days.

(21) Appl. No.: 16/207,816

(22) Filed: Dec. 3, 2018

(65) Prior Publication Data

US 2019/0099815 A1    Apr. 4, 2019

Related U.S. Application Data

(60) Division of application No. 15/032,000, filed on Apr. 25, 2016, now Pat. No. 10,173,273, and a
(Continued)

(51) Int. Cl.
*B23C 3/18* (2006.01)
*B24B 19/14* (2006.01)
(Continued)

(52) U.S. Cl.
CPC .................. *B23C 3/18* (2013.01); *B23C 5/10* (2013.01); *B23P 15/02* (2013.01); *B24B 9/00* (2013.01);
(Continued)

(58) Field of Classification Search
CPC ....... B23C 3/18; B23C 5/10; B23C 2210/084; B23P 15/02; B24D 5/02; B24B 9/00; B24B 19/14
See application file for complete search history.

(56) References Cited

U.S. PATENT DOCUMENTS 2,646,653 A    7/1953  Murchison
2,680,392 A    6/1954  Gaved
(Continued)

FOREIGN PATENT DOCUMENTS

WO    2015112716    7/2015

OTHER PUBLICATIONS

International Search Report and Written Opinion dated Jun. 17, 2015 in PCT Application No. PCT/US2015/012461.
(Continued)

*Primary Examiner* — Moshe Wilensky
(74) *Attorney, Agent, or Firm* — Snell & Wilmer L.L.P.

(57) ABSTRACT

A forming tool for forming leading edges of turbine blades is disclosed. In various embodiments, a forming tool may comprise a cylindrically-shaped body having a notch around the circumference of the cylindrically-shaped body. The notch may be positioned perpendicularly to a center axis of the cylindrically-shaped body. Further, the notch may have a notch contour with an upper notch contour and a lower notch contour, and where the notch contour is a relief of a selected turbine blade leading edge. The forming tool may be a grinding tool or a cutting tool. Moreover, a forming process may comprise forming, by a forming tool, a first portion of a turbine blade leading edge with a rough edge result, and forming, by a milling cutter, a second portion of the turbine blade leading edge with a rough edge result.

5 Claims, 9 Drawing Sheets

Related U.S. Application Data continuation of application No. PCT/US2015/012461, filed on Jan. 22, 2015.

(51) Int. Cl.
- *B23C 5/10* (2006.01)
- *B24D 5/02* (2006.01)
- *B24B 9/00* (2006.01)
- *B23P 15/02* (2006.01)

(52) U.S. Cl.
CPC ............... *B24B 19/14* (2013.01); *B24D 5/02* (2013.01); *B23C 2210/084* (2013.01); *B23C 2215/44* (2013.01); *B23C 2224/36* (2013.01); *B23C 2226/31* (2013.01); *B23C 2228/10* (2013.01)

(56) References Cited

U.S. PATENT DOCUMENTS

| | | |
|---|---|---|
| 2009/0081931 A1 | 3/2009 | Levsen |
| 2011/0312253 A1 | 12/2011 | Shimizu et al. |
| 2013/0165021 A1 | 1/2013 | Jensen et al. |
| 2013/0295823 A1 | 11/2013 | Hasegawa |
| 2014/0323022 A1 | 10/2014 | Rizzo |

OTHER PUBLICATIONS

International Preliminary Report on Patentability dated Jul. 26, 2016 in PCT Application No. PCT/US2015/012461.

USPTO: Restriction Requirement Issued in U.S. Appl. No. 15/032,000 dated Jan. 11, 2018.

USPTO: Non-Final Office Action Issued in U.S. Appl. No. 15/032,000 dated May 2, 2018.

USPTO: Notice of Allowance Issued in U.S. Appl. No. 15/032,000 dated Sep. 26, 2018.

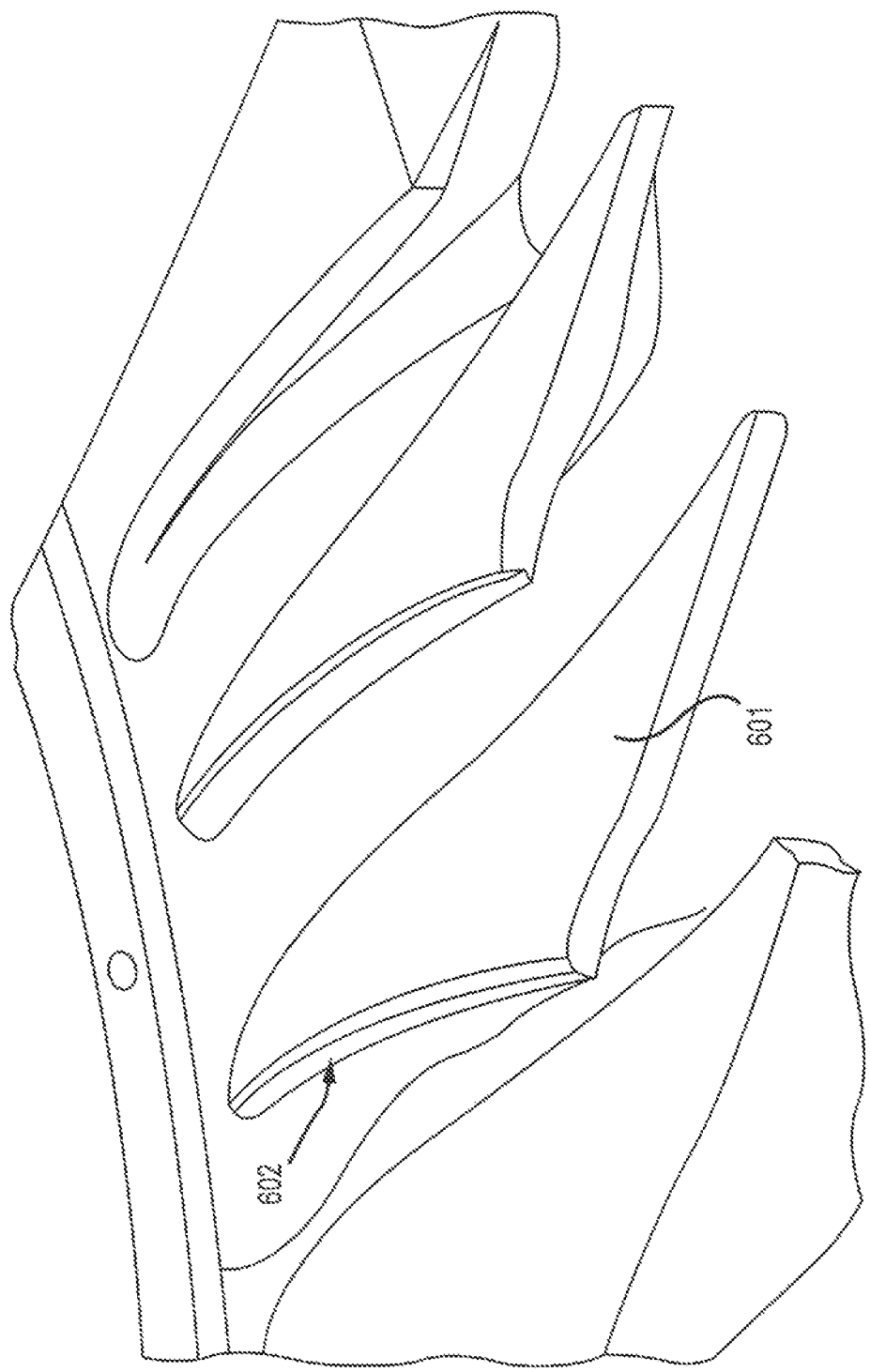

FORMING TOOL FOR LEADING EDGE OF TURBINE BLADES

CROSS-REFERENCE TO RELATED APPLICATIONS

This application is a divisional of, and claims priority to, and benefit of, U.S. Ser. No. 15/032,000, filed Apr. 25, 2016 and entitled "FORMING TOOL FOR LEADING EDGE OF TURBINE BLADES." This application is also a continuation of, and claims priority to, and benefit of, PCT/US2015/012461 filed on Jan. 22, 2015 and entitled "FORMING TOOL FOR LEADING EDGE OF TURBINE BLADES," which claims priority from U.S. Provisional Application No. 61/931,429 filed on Jan. 24, 2014 and entitled "FORMING TOOL FOR LEADING EDGE OF TURBINE BLADES." Each of the three afore-mentioned applications are incorporated herein by reference in their entirety for all purposes.

FIELD

The present disclosure relates to forming leading edges of turbine blades, and more particularly, to a forming tool with designed relief notches for forming the leading edges of fan blades and compressor blades.

BACKGROUND

In the machining of rotor blades, for example rotor blades used in an integrally bladed fan and/or compressor, point milling is usually employed for cutting the leading edge. If the rotor blades are thin, it is difficult to machine the very tip of the leading edge due to chattering and deflection induced by the cutting action. The resulting tip of the leading edge may deviate from an ideal shape, which may result in impaired aerodynamic performance. A typical prior art process of forming a fan or compressor blade edge includes removing material from a blade edge, leaving the blade with a rough edge. Additional blade edge material is then removed to form a semi-finished edge. Point-milling may be applied to the semi-finished blade edge to form a finished edge.

SUMMARY

A forming tool for forming leading edges of turbine blades is disclosed. In various embodiments, a forming tool may comprise a cylindrically-shaped body having a notch around the circumference of the cylindrically-shaped body. The notch may be positioned perpendicularly to a center axis of the cylindrically-shaped body. Further, the notch may have a notch contour with an upper notch contour and a lower notch contour, and the notch contour may be a relief of a selected turbine blade leading edge. The forming tool may be a grinding tool or a cutting tool.

Moreover, in various embodiments, a forming process may comprise forming, by a forming tool, a first portion of a turbine blade leading edge with a rough edge result, and forming, by a milling cutter, a second portion of the turbine blade leading edge with a rough edge result. The first portion may be the edge tip area of the turbine blade and the second portion may be the remaining area of the turbine blade.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 6A-6B illustrate various stages of a forming process of a turbine blade using a point milling tool;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, electrical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
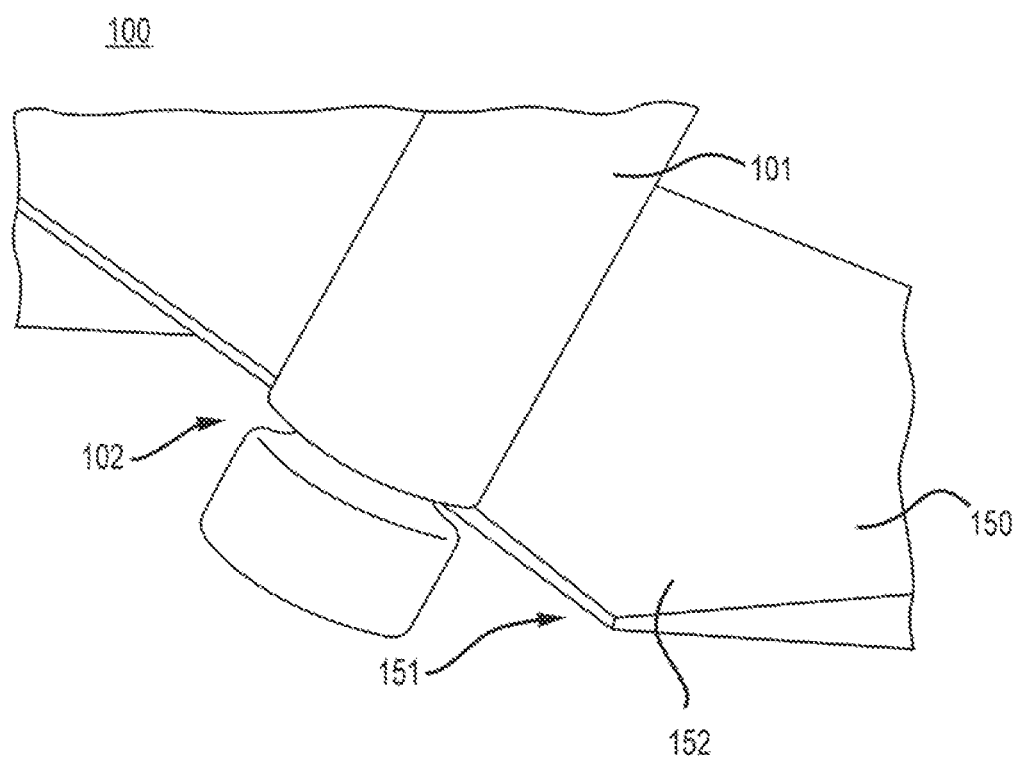
FIG. 1 illustrates, in accordance with various embodiments, a perspective view of a forming tool in contact with a turbine blade.

A forming tool for shaping a leading edge of a turbine blade is disclosed. In accordance with various embodiments, and with reference to FIG. 1, a forming tool 100 is a rotary tool and may comprise a cylindrically-shaped body 101 having a notch 102 spanning a circumference of the cylindrically-shaped body 101. As shown, the forming tool 100 is in contact with a leading edge 151 of a turbine blade 150 near an edge tip 152. In various embodiments, the forming tool 100 may be in contact with the edge tip 152 and substantially centered on the nose point. As used herein, the edge tip 152 is the distal end of the blade away from a rotor attachment point. Further, as used herein, the nose tip is the geometric center of the leading edge. The cylindrically-shaped body 101 may comprise a carbide material, typically in the form of a cylinder, though other shapes may be implemented. The carbide material may include calcium carbide, silicon carbide, iron carbide, or tungsten carbide. The body 101 may also be at least partially comprised of diamond material or other cutting materials. In various embodiments, the surface of the notch 102 may be formed of a cutting material, for example, a cemented tungsten carbide wrapped around a carbide blank. In various embodiments, the cylindrically-shaped body 101 may be about ⅜ inch in diameter. Moreover, in various embodiments, the forming tool 100 may further comprise at least one of a diamond coating, a nitride coating, or a titanium nitride (TiN) coating on a surface of the notch 102. In various embodiments, a diamond material may be embedded to the surface of the notch 102. The coating or insert may increase the hardness of the forming surface and increase the usable life of the forming tool.

Figure 2:
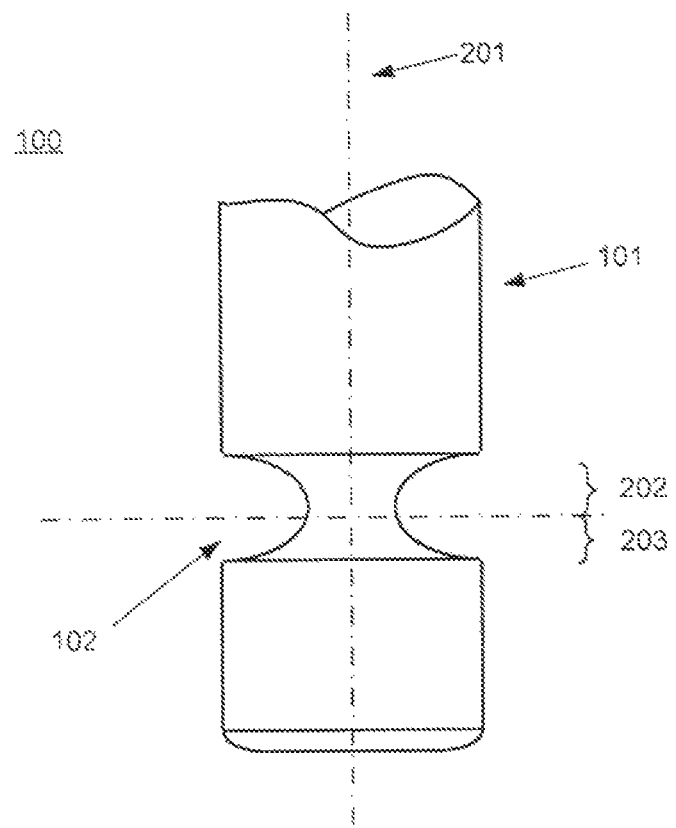
FIG. 2 illustrates, in accordance with various embodiments, a sectional view of a forming tool.

In various embodiments, and with reference to FIG. 2, the notch 102 may be positioned perpendicularly to a center axis 201 of the cylindrically-shaped body 101. Furthermore, the notch 102 may have a notch contour with an upper notch contour 202 and a lower notch contour 203, and wherein the notch contour is a relief of a selected turbine blade leading edge. The notch 102 may comprise a recess about the circumference of the body 101 of the forming tool 100.

Figure 3:
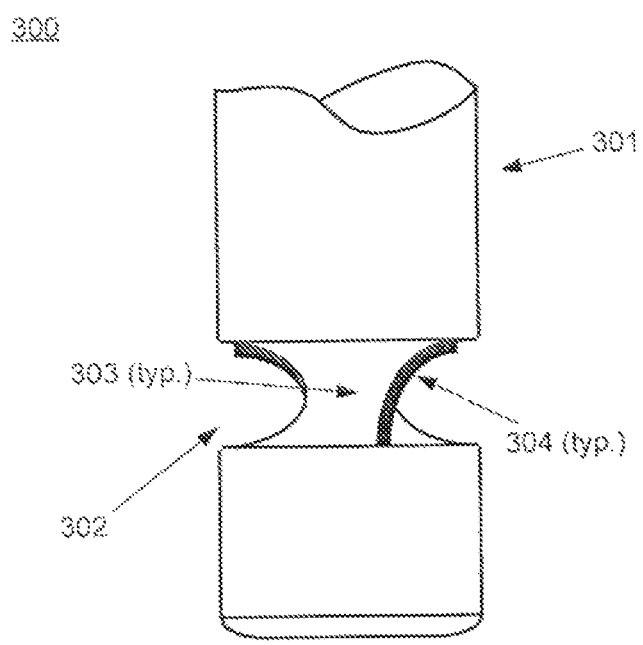
FIG. 3 illustrates, in accordance with various embodiments, a sectional view of a forming tool with cutting edges and flutes.

In various embodiments, the forming tool 100 may be a grinding forming tool used to grind a blade edge. In various embodiments and with reference to FIG. 3, a forming tool may be a cutting forming tool 300 used to cut a blade edge. The cutting forming tool 300 may comprise a cylindrically-shaped body 301 having a notch 302 spanning a circumference of the cylindrically-shaped body 301, at least four flutes 303 about the notch 302 and at least four cutting edges 304. For example, four cutting edges 304 may be spaced equidistant around the circumference of the cylindrically-shaped body 301, thereby creating four flutes 303. The flutes are the grooves that allow for the cut material to be ejected as the cutting occurs.

Figure 4:
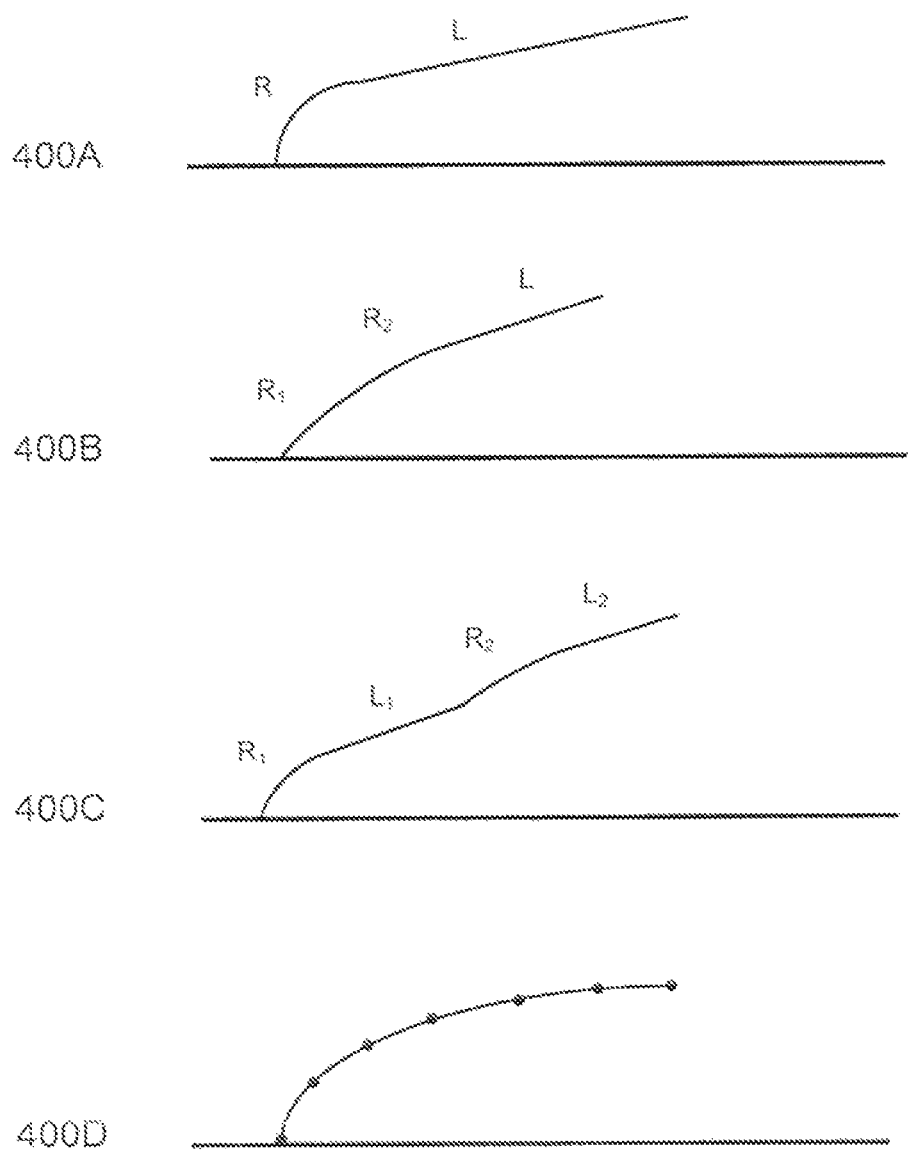
FIG. 4 illustrates, in accordance with various embodiments, multiple variations of notch contours of a forming tool.

As mentioned above with reference to FIG. 2, the notch 102 may have an upper notch contour 202 and a lower notch contour 203. Each of the upper and lower notch contours may have independently designed contours. The upper notch contour 202 and lower notch contour 203 may have the same contours or may have different contours. As used herein, "same contour" may refer to a notch contour having the same notch radii, same notch depth, and same notch height as another notch contour. Further, as used herein "different contour" may refer to different notch radii, different notch depth, different notch height, or combinations of thereof with regard to at least two notches. A designed notch contour may have different portions and shapes, some of which are shown in FIG. 4. The designed notch contour may typically be an elliptical shape. For example, contour variation 400A illustrates a single radii curvature (R) connected a line segment (L). Variation 400B illustrates a first radii curvature ($R_1$) connected to a second radii curvature ($R_2$), and the second radii curvature ($R_2$) is connected to a line segment (L). The designed contour variation 400C illustrates a first radii curvature ($R_1$) connected to a first line segment ($L_1$), the first line segment ($L_1$) connected to a second radii curvature ($R_2$), and the second radii curvature ($R_2$) is connected to a second line segment ($L_2$). One example of a designed notch contour may include first portion having a first radii curvature of 0.005 inches connected to a second portion have a second radii curvature of 0.022 inches. Further, as would be understood, the designed contour may comprise any number of radii curvatures and any number of line segments. Further, the designed contour may comprise a point-defined contour, as illustrated in contour variation 400D.

The notch contour of the notch may be designed to be a relief of a selected turbine blade leading edge. In various embodiments, the leading edge of the edge tip area of a turbine blade may be approximately ⅟30,000 inch thick, and the tolerance of the finished edge may be approximately ±⅟2000 of an inch. The designed contour and the additional support provided by the forming tool may facilitate achieving this tolerance level. The forming tool is more precise than hand scraping, and tends to reduce processing times.

Figure 5:
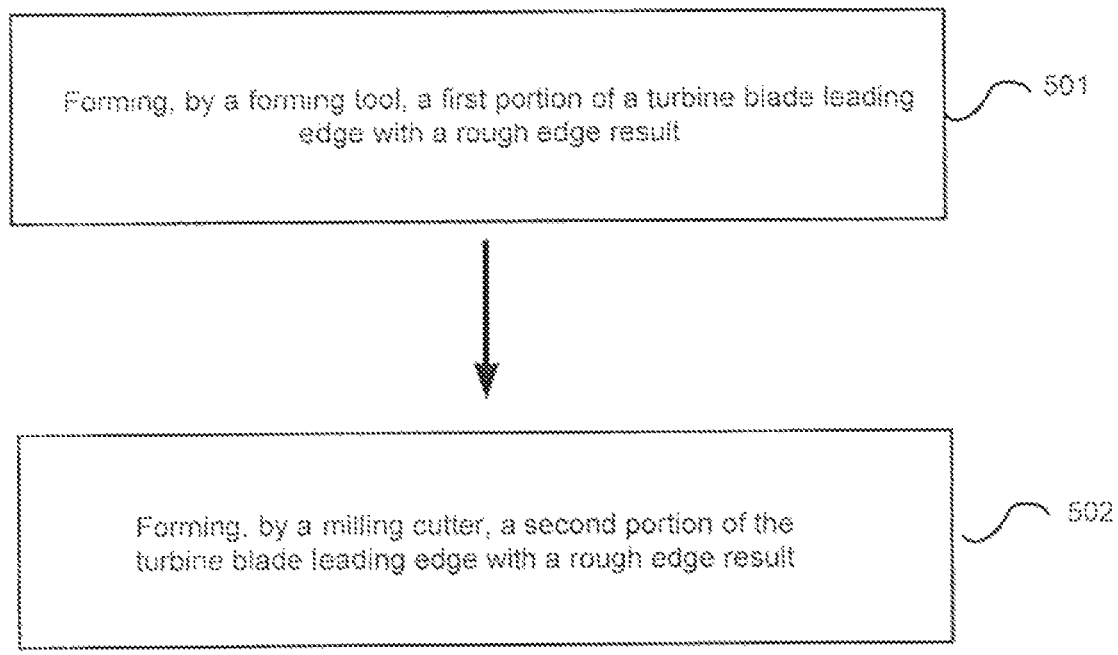
FIG. 5 illustrates, in accordance with various embodiments, an exemplary forming process of a turbine blade leading edge.
Figure 6B:
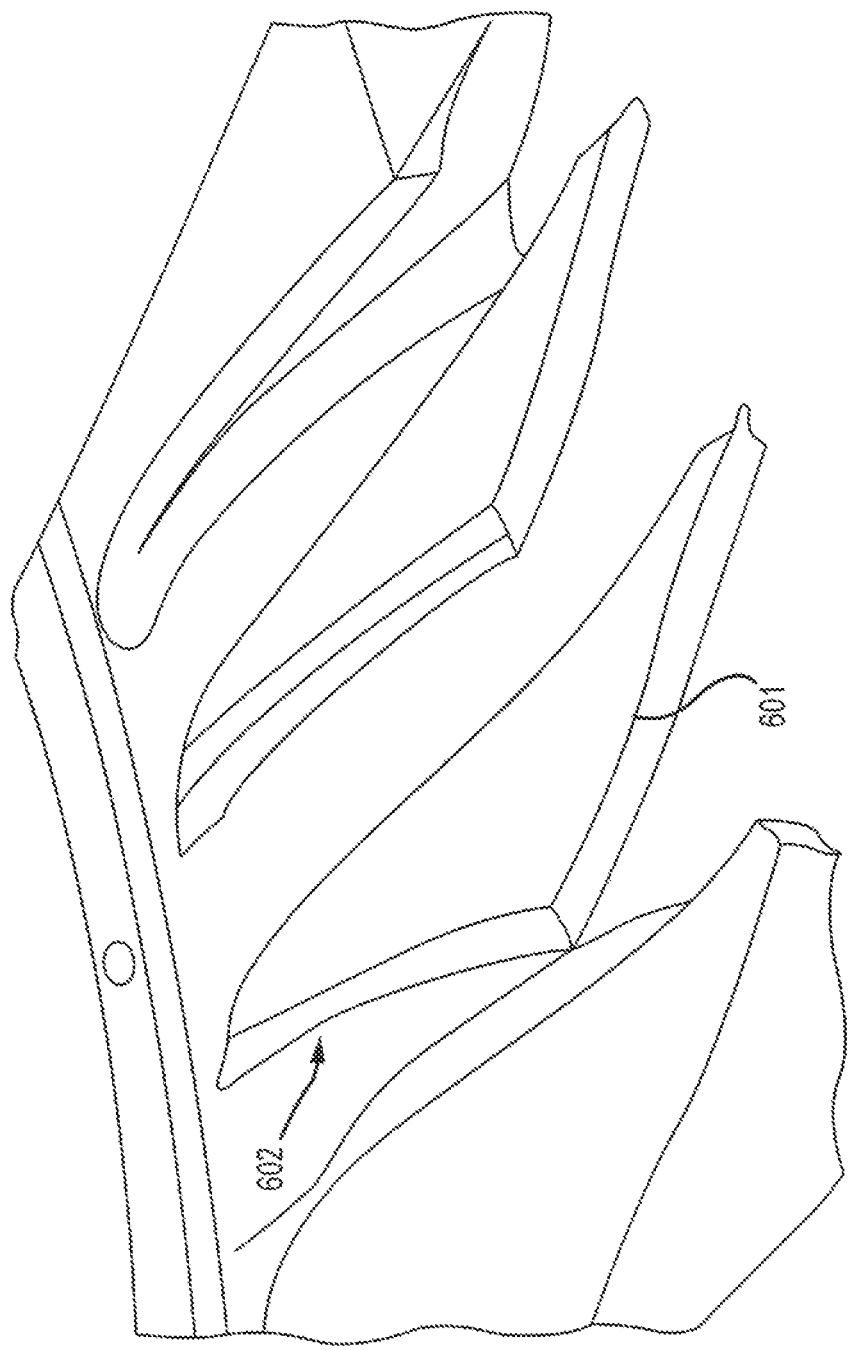
Figure 6C:
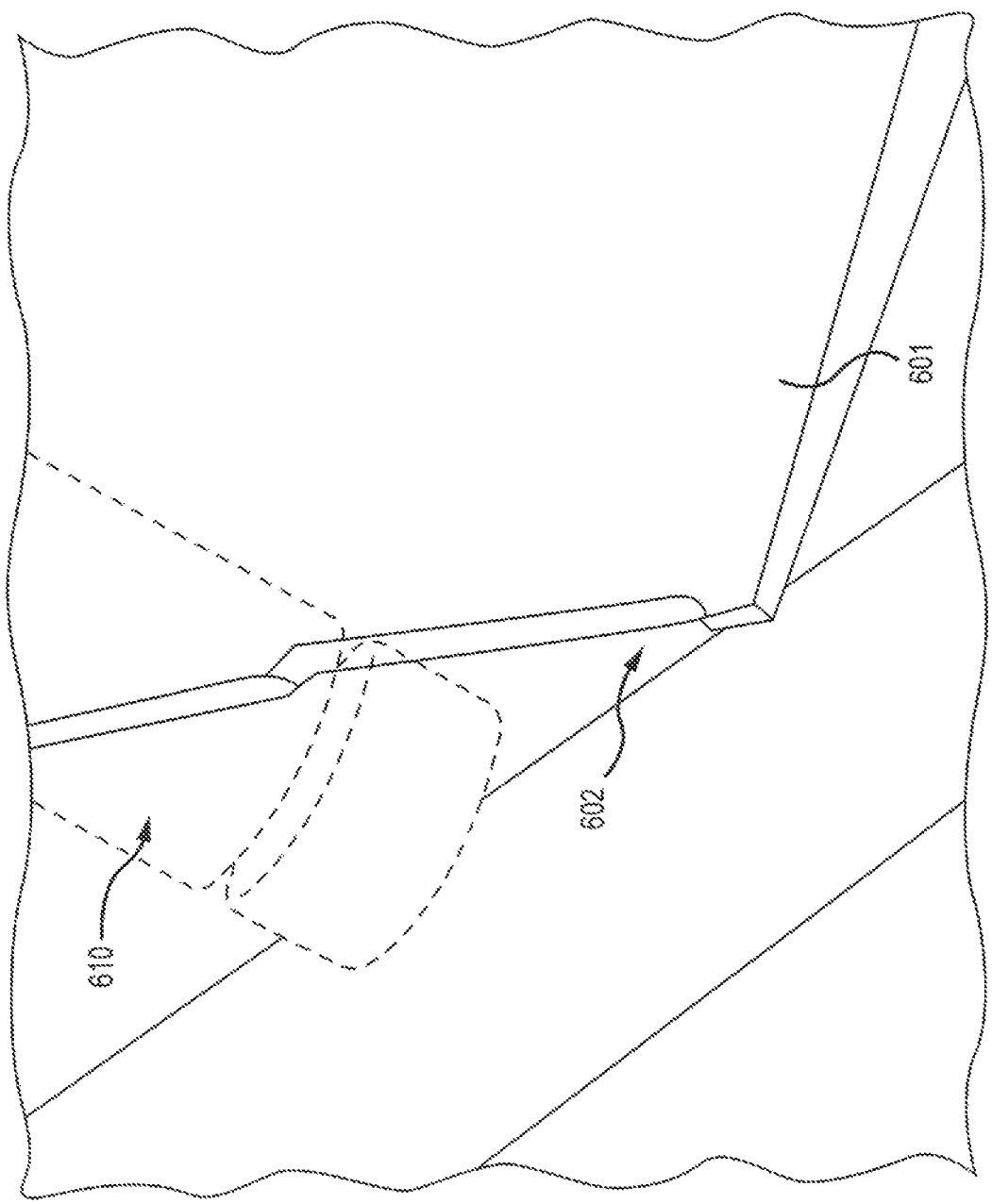
FIG. 6C illustrates an exemplary forming process of a turbine blade using an exemplary forming tool.

In accordance with various embodiments, and with reference to FIG. 5, a forming process 500 may comprise forming, by a forming tool, a first portion of a turbine blade leading edge with a rough edge result 501, and forming, by a milling cutter, a second portion of the turbine blade leading edge with a rough edge result 502. In various embodiments, a rough edge result may be the partially finished condition of a leading edge that has had some of the leading edge material removed but is not yet at a final shape. The first portion may be an edge tip area of the turbine blade and the second portion may be the remaining area of the turbine blade. The forming tool used in the forming process may be the same as or similar to forming tool 100 or forming tool 300 as disclosed herein. For illustrative purposes, FIGS. 6A-6C show a process of a forming tool shaping a leading edge of a turbine blade. FIG. 6A illustrates an exemplary turbine blade 601 having an unshaped leading edge 602. FIG. 6B illustrates an exemplary turbine blade 601 with a leading edge 602 that has been shaped by a point milling tool. FIG. 6C illustrates a close-up of a forming tool 610 removing material from the leading edge 602 of the turbine blade 601, resulting in partially finished leading edge, depending on the desired finished shape.

In an exemplary process, edge material is not cleared from the blade edge, which reduces the process by a step and decreases the processing time. Furthermore, the edge forming process may occur later in the blade forming process compared to prior art processes, for example after the turbine blades are not connected to a support frame. Moreover, the forming process may be applied to turbine blades that are independent from other blades or other support structures. In prior art processes, a turbine blade is typically still attached to adjacent blades or other support structures when the edges are forming. The additional attachment provides support to reduce vibrations caused by a cutting tool forming the blades. In the exemplary process, the notch is in contact with the top and bottom of the blade's leading edge, and provides the support to the edge tip area of the blade to reduce vibration during the forming process.

Figure 7:
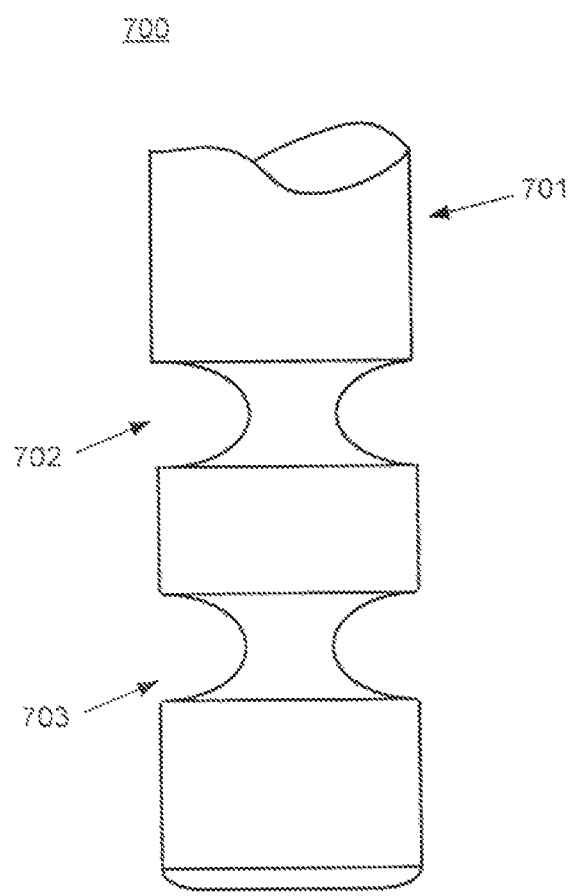
FIG. 7 illustrates, in accordance with various embodiments, a perspective view of a forming tool with multiple notches.

The leading edge of a turbine blade near the edge tip area may the thinnest, and then broadens as the blade edge approaches the rotor. Accordingly, the desired leading edge shape may also increase in size long the edge. In accordance with various embodiments and with reference to FIG. 7, a forming tool 700 may comprise a cylindrically-shaped body 701 having a first notch 702 and a second notch 703, each notch 702, 703 individually located around the circumference of the cylindrically-shaped body 701. First notch 702 and second notch 703 are each similar to notch 102 described above. In various embodiments, a first notch contour of the first notch 702 may be different than a second notch contour of the second notch 703. The different contour shapes may be designed to accommodate for the different edge shapes along a blade's leading edge. An exemplary forming process may include implementing a single forming tool and then applying multiple notch contours of the single forming tool at the selected portions of the turbine blade. In other various embodiments, the first notch contour of the first notch 702 may be the same as the second notch contour of the second notch 703. Each notch contour being the same may be beneficial for increasing the usable life of the forming tool 700. The first notch 702 and second notch 703 may be swapped for use during the forming process. This allows the notch area to cool between uses and extend usable life.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A forming process comprising:
    forming, by a forming tool, a first portion of a turbine blade leading edge in rough condition;
    forming, by a milling cutter, a second portion of the turbine blade leading edge in rough condition; wherein:
        the forming tool has a notch around a circumference of a cylindrically-shaped body,
        a notch contour of the notch is a relief of a selected turbine blade leading edge, and
        the forming tool is a cutting forming tool comprising at least four flutes at an interior point of the notch.

2. The forming process of claim 1, wherein the first portion of the turbine blade leading edge is an edge tip area.

3. The forming process of claim 1, wherein a turbine blade including the turbine blade leading edge is independent from at least one of a second turbine blade and a support structure during the forming process.

4. The forming process of claim 1, further comprising providing, by the forming tool, support to an edge tip area of the turbine blade leading edge to reduce vibration during the forming process.

5. The forming process of claim 4, wherein the forming tool makes contact on least two surfaces of the turbine blade leading edge during the forming process.

\* \* \* \* \*